United States Patent Office 3,556,748
Patented Jan. 19, 1971

3,556,748
ANTIOXIDANT MIXTURE OF N-PHENYL-N'-SEC-ALKYL - ORTHO - PHENYLENEDIAMINE AND N,N' - DI - SEC - ALKYL-ORTHO-PHENYLENE-DI AMINE, AND USE THEREOF
Russell F. Stedman, Des Plaines, Ill., assignor to Universal Oil Products Company, Des Plaines, Ill., a corporation of Delaware
No Drawing. Filed July 5, 1966, Ser. No. 562,502
Int. Cl. C10l 1/22
U.S. Cl. 44—72         9 Claims

ABSTRACT OF THE DISCLOSURE

A mixture of N-phenyl-N'-sec-alkyl-ortho-phenylenediamine and an N,N'-di-sec-alkyl-ortho-phenylenediamine. The mixture is useful as an antioxidant in gasoline.

---

This invention relates to a novel antioxidant composition which offers advantages in the stabilization of hydrocarbon distillates and particularly gasoline.

In the chlorination and nitration of benzene, both para-nitrochlorobenzene and ortho-nitrochlorobenzene are formed. The para-nitrochlorobenzene is in great demand for the manufacture of para-nitroaniline which is utilized in the manufacture of various antioxidants and antiozonants of the N,N'-di-sec-alkyl-p-phenylenediamine type and as intermediates for the manufacture of other chemicals presently in large demand. However, the ortho-nitrochlorobenzene at present is in small demand and there is an important need to economically utilize the same.

The present invention offers a novel antioxidant mixture, both of the components of the mixture being derived from ortho-nitrochlorobenzene. In addition to discovering a novel utilization of the surplus ortho-nitrochlorobenzene and accordingly of being able to provide a product at lower cost, the novel mixture of the present invention offers advantages for use as an antioxidant in hydrocarbon distillates and particularly in gasoline as will be shown by the examples appended to present application. The novel mixture produces an antioxidant composition of improved potency both in increasing the induction period of the gasoline and in accelerating sweetening of sour gasoline.

From the hereinbefore discussion, it will be noted that the novel mixture of the present invention serves to utilize ortho-nitrochlorobenzene, which is available in large quantities and at low cost, and surprisingly produces an antioxidant composition of improved properties, apparently due to a synergistic effect.

In one embodiment, the present invention relates to an antioxidant composition of N-phenyl-N'-sec-alkyl-ortho-phenylenediamine and N,N'-di-sec-alkyl-ortho-phenylenediamine.

In a specific embodiment the antioxidant composition contains from about 10% to about 90% and more particularly from about 20% to about 80% by weight of N-phenyl - N' - sec-alkyl-ortho-phenylenediamine and from about 10% to about 90% and more particularly from about 20% to about 80% by weight of N,N'-di-sec-alkyl-ortho-phenylenediamine.

The N-phenyl-N'-sec-alkyl-ortho-phenylenediamine for use in the antioxidant composition preferably contains from 3 to 20 carbon atoms in said alkyl and more particularly from 3 to 12 carbon atoms. A particularly preferred compound is N-phenyl - N' - sec-butyl-ortho-phenylenediamine. Other compounds include N-phenyl-N'-isopropyl-ortho-phenylenediamine, N-phenyl - N' - sec-amyl-ortho-phenylenediamine, N-phenyl - N' - sec-hexyl-ortho-phenylenediamine, N-phenyl - N' - sec-heptyl-ortho-phenylenediamine, N - phenyl - N'-sec-octyl-ortho-phenylenediamine, N-phenyl-N'-sec-nonyl-ortho-phenylenediamine, N-phenyl-N'-sec-decyl - ortho - phenylenediamine, N-phenyl-N'-sec-undecyl-ortho-phenylenediamine, N-phenyl-N'-sec-dodecyl- ortho-phenylenediamine, N-phenyl - N' - sec-tridecyl-ortho-phenylenediamine, N-phenyl - N' - sec-tetradecyl-ortho-phenylenediamine, N-phenyl - N' - sec-pentadecyl-ortho-phenylenediamine, N-phenyl - N' - sec-hexadecyl-ortho-phenylenediamine, N-phenyl - N' - sec-heptadecyl-ortho-phenylenediamine, N-phenyl - N' - sec-octadecyl-ortho-phenylenediamine, N-phenyl - N' - sec-nonadecyl-ortho-phenylenediamine, N-phenyl - N' - sec-eicosyl-ortho-phenylenediamine, etc. While the N-phenyl-N'-sec-alkyl-ortho-phenylenediamine is preferred, it is understood that the corresponding N-naphthyl - N' - sec-alkyl-ortho-phenylenediamine may be used and that the phenyl or naphthyl rings may contain substituents attached thereto and particularly hydrocarbon groups and more particularly alkyl group or groups of from 1 to 6 carbon atoms each. Also it is understood that a mixture of the N-phenyl-N'-sec-alkyl-ortho-phenylenediamines and/or a mixture of N-naphthyl-N'-sec-alkyl-ortho-phenylenediamines may be used.

The N,N'-di-sec-alkyl-ortho-phenylenediamine for use in the antioxidant composition of the present invention preferably contains from 3 to about 20 and more particularly from 3 to 12 carbon atoms in each of the alkyls. A particularly preferred compound is N,N'-di-sec-butyl-ortho-phenylenediamine. Other compounds include N,N'-di-isopropyl-ortho-phenylenediamine, N,N' - di - sec-amyl-ortho-phenylenediamine, N,N' - di - sec-hexyl-ortho-phenylenediamine, N,N' - di - sec-heptyl-ortho-phenylenediaminine, N,N' - di - sec-octyl-ortho-phenylenediamine, N,N' - di - sec-nonyl-ortho-phenylenediamine, N,N' - di-sec-decyl - ortho - phenylenediamine, N,N'-di-sec-undecyl-ortho-phenylenediamine, N,N'-di-sec - dodecyl-ortho-phenylenediamine, N,N'-di-sec - tridecyl - ortho-phenylenediamine, N,N' - di - sec-tetradecyl-ortho-phenylenediamine, N,N' - di - sec- pentadecyl-ortho-phenylenediamine, N,N'-di - sec - hexadecyl-ortho-phenylenediamine, N,N'-di-sec-heptadecyl-ortho-phenylenediamine, N,N' - di - sec-octadecyl-ortho-phenylenediamine, N,N' - di - sec-nonadecyl-ortho-phenylenediamine, N,N' - di - sec-eicosyl-ortho-phenylenediamine, etc. Here again, it is understood that a mixture of N,N'-di-sec-alkyl ortho-phenylenediamines may be used, each of the alkyls being of the same or of different configuration or number of carbon atoms.

The antioxidant composition will contain the N-phenyl-N'-sec-alkyl - ortho-phenylenediamine and N,N' - di-sec-alkyl-ortho-phenylenediamine in suitable proportions for the desired results. In general, these concentrations comprise from about 10% to about 90% and more particularly from 20% to 80% by weight of the N-phenyl-N'-sec-alkyl-ortho-phenylenediamine and from about 10% to about 90% and more particularly from about 20% to about 80% by weight of N,N' - di - sec - alkyl-ortho-phenylenediamine.

While the N-phenyl - N' - sec - alkyl - ortho-phenylenediamine and the N,N'-di - sec - alkyl - ortho - phenylenediamine may be prepared in any suitable manner, it is of particular advantage that these are derived from ortho-nitrochlorobenzene as hereinbefore set forth. The ortho-nitrochlorobenzene may be converted to ortho-nitroaniline by reaction with ammonia. This is a well-known reaction and is adequately described in the prior art. The ortho-nitroaniline is converted to ortho - nitro-diphenylamine and then reductively alkylated with a suitable ketone to obtain th desired N-phenyl-N'-sec-alkyl-ortho-phenylenediamine. Similarly, the ortho-nitroaniline is reductively alkylated with a suitable ketone to obtain the desired N,N'-di-sec - alkyl - ortho-phenylenediamine.

The reductive alkylation is effected in any suitable manner and, here again, the process is adequately described in the prior art. As hereinbefore set forth, it is understood that any suitable method of preparing the desired compounds from the ortho-nitrochlorobenzene may be used in accordance with the present invention. For example, another method is to react ortho-nitrochlorobenzene with aniline to form ortho - nitro - diphenylamine and then reductively alkylating with the desired ketone. In a preferred embodiment, the N-phenyl-N'-sec-alkyl-ortho-phenylenediamine and the N,N'-di-sec-alkyl-ortho-phenylenediamine are separately prepared and then blended in the desired proportions to form the antioxidant composition. It is understood that these compounds may be prepared simultaneously by reaction of the ortho-nitrochlorobenzene or ortho - nitroaniline with suitable reactants. It appears that the separate preparation and subsequent blending of these compounds is a preferred method for producing the antioxidant composition of the present invention.

The antioxidant composition may be prepared as a solution in a suitable solvent. Any suitable solvent may be used including gasoline, selected aromatic fraction such as benzene, toluene, xylene, cumene or mixture thereof, or selected paraffin fraction such as hexane, heptane, octane, nonane, etc., or mixture thereof, or mixture of aromatic, paraffinic, and/or naphthenic hydrocarbons. In keeping with the desire to form a low cost antioxidant composition, the solvent preferably comprises an inexpensive byproduct solvent, as for example, xylene bottoms which are available commercially at a reduced cost.

The N-phenyl - N' - sec - alkyl-ortho-phenylenediamine and the N,N'-di-sec-alkyl-ortho-phenylenediamine may each be formed as separate solutions and added separately to the gasoline or these may be formed as a mixed solution in one or a mixture of solvents. While these additives may be incorporated in the gasoline, either separately or in admixture without the use of a solvent, it generally is preferred to use a solvent for ease in handling and mixing. Also when one or both of these additives are prepared in the presence of a solvent, all or part of the solvent may be retained and used as all or part of the solvent in the final mixture.

As hereinbefore set forth the antioxidant composition is used in hydrocarbon distillate including gasoline, naphtha, kerosene, diesel fuel, fuel oil, lubricating oil, etc. The lubricating oil also may be of synthetic origin, including, for example, alkyl esters such as dioctyl sebacate, dialkyl adipate, etc. The antioxidant composition may be used in a concentration within the range of from about 0.001% to about 1% and more particularly from about 0.001% to about 0.1% by weight of the hydrocarbon distillate. It is understood that the antioxidant composition may be used in conjunction with other additives which are incorporated in the hydrocarbon distillate including, for example, tetraethyl lead or other anti-knock agent, metal deactivator, deicer, detergent, dye, etc.

As hereinbefore set forth, the novel antioxidant composition of the present invention offers important advantages in addition to the low cost resulting from the utilization of the surplus ortho-nitrochlorobenzene. The mixture offers improved sweetening properties as compared to the use of the N-phenyl-N'-sec - alkyl - ortho-phenylenediamine alone and improved antioxidant properties as compared to the use of the N,N'-sec-alkyl-ortho-phenylenediamine alone. Surprisingly, both of these properties are improved beyond the results which would be expected from the use of each of these components separately.

The following examples are introduced to illustrate further the novelty and utility of the present invention but not with the intention of unduly limiting the same.

EXAMPLE I

The gasoline used in this example was an uninhibited commercial gasoline. The gasoline was treated with caustic methanol to produce a sweet gasoline. The gasoline then was made sour by the incorporation therein of 0.005% by weight of n-octyl mercaptan. For evaluation purposes, it appears to be of advantage to add a specific mercaptan in the desired concentration rather than to use a sour gasoline which may contain a mixture of mercaptans. In this way, the blank or control sample is uniform and readily reproducible.

The antioxidant composition of this example is a mixture of N-phenyl-N'-sec-butyl-ortho-phenylenediamine and N,N'-di-sec-butyl-ortho-phenylenediamine. Each of these was separately prepared as a solution in an aromatic solvent and each solution then was separately added to the gasoline in the desired concentrations.

The following table reports the results obtained with a control sample of the gasoline and with samples of the gasoline containing different concentrations of each of the components used separately and of the components used in admixture.

TABLE I

| Run No. | Additive | Concentration, percent by wt. | Induction period |
| --- | --- | --- | --- |
| 1 | None | | 145 |
| 2 | N-phenyl-N'-sec-butyl-ortho-phenylenediamine. | 0.0032 | 470 |
| 3 | do | 0.0064 | 645 |
| 4 | N,N'-di-sec-butyl-orho-phenylenediamine. | 0.0008 | 235 |
| 5 | do | 0.0016 | 310 |
| 6 | N-phenyl-N'-sec-butyl-ortho-phenylenediamine. Plus N,N'-di-sec-butyl-ortho-phenylenediamine. | 0.0024 0.0008 | 495 |
| 7 | N-phenyl-N'-sec-butyl-ortho-phenylenediamine. Plus N,N'-di-sec-butyl-ortho-phenylenediamine. | 0.0048 0.0016 | 665 |

From a comparison of Run No. 2 with Run No. 6, it will be seen that, for total additive concentration of 0.0032% by weight, the induction period of the mixture is 495 minutes as compared to 470 minutes for the more potent additive alone. Similarly, a comparison of Run No. 3 with Run No. 7 shows that, for a total additive concentration of 0.0064% by weight, the mixture produced an induction period of 665 minutes as compared to 645 minutes in Run No. 3. The improved results obtained by using the mixture apparently is due to a synergistic effect because it produces a higher induction period than would be expected. Normally it would be expected that using the less potent additive would lower the effectiveness of the more potent additive and the mixture would give an induction period intermediate those obtained with each additive alone.

EXAMPLE II

The gasoline of Example I was subjected to sweetening by being commingled with the different additives and allowed to stand in admixture with 5 liquid volume percent of 10° Baumé caustic solution. The different samples were examined periodically for mercaptan sulfur content and also whether the sample was negative or positive to the doctor test.

The control sample of the gasoline had a mercaptan sulfur content of 0.004% by weight after 7 days and still was sour to the doctor test.

The samples containing either 0.0032% by weight or 0.0064% by weight of N-phenyl-N'-sec-butyl-ortho-phenylenediamine were still sour after 5 days.

In contrast to the above, the sample containing a total of 0.0032% by weight of the mixture (see Run 6 of Table I) was sweet after 5 days and the sample containing 0.0064% by weight of the mixture (see Run 7 of Table I) was sweet after 4 days. Thus, it is seen that the mixture served to accelerate inhibitor sweetening of the gasoline.

EXAMPLE III

Samples of the gasoline sweetened as described in Example II also were evaluated by the 4-hour accelerated gum test. All of these samples had been evaluated after being subjected to the sweetening test described in Example II for 7 days. The control sample is reported as "Broke," which means that the induction period was below 200 and accordingly that the gum was too high to even measure. The samples containing 0.0032% and 0.0064% by weight of N-phenyl-N'-sec-butyl-ortho-phenylenediamine had values of 6.0 and 5.6 mg./100 ml. of gum respectively. The samples containing 0.008% and 0.0016% by weight of N,N'-di-sec-butyl-ortho-phenylenediamine had values of 20.8 and 32.8 mg./ml. of gum respectively. In contrast, the samples containing 0.0032% and 0.064% by weight of the mixture of additives had values of 4.9 and 4.2 mg./100 ml. of gum respectively. Here again, it will be noted that the mixture served to improve the stability of the gasoline to a greater extent than obtained by either component alone and is superior to what normally would be expected. In addition to the improvements due to the synergistic effect, the antioxidant mixture appears unique in offsetting the less desirable properties of each of the individual components in order to produce a final product of improved properties.

EXAMPLE IV

The antioxidant composition of this example is a mixture of 50% by weight of N-phenyl-N'-isopropyl-ortho-phenylenediamine, 35% by weight of N,N'-di-isopropyl-ortho-phenylenediamine and 15% by weight of aromatic solvent.

EXAMPLE V

The antioxidant composition of Example IV is utilized ture of 60% by weight of N-phenyl-N'-sec-hexyl-ortho-phenylenediamine and 40% by weight of N,N'-di-sec-amyl ortho-phenylenediamine.

EXAMPLE VI

The antioxidant composition of Example IV is utilized in a concentration of 0.01% by weight as an additive in kerosene and serves to retard oxidative deterioration of the kerosene.

I claim as my invention:

1. A mixture of from about 10% to about 90% by weight of N-phenyl-N'-sec-alkyl-ortho-phenylenediamine and from about 10% to about 90% by weight of N,N'-di-sec-alkyl-ortho-phenylenediamine.

2. The mixture of claim 1 wherein said N-phenyl-N'-sec-alkyl-ortho-phenylenediamine contains from 3 to about 20 carbon atoms in said alkyl.

3. The mixture of claim 2 wherein said N-phenyl-N'-sec-alkyl-ortho-phenylenediamine is N - phenyl-N'-sec-butyl-ortho-phenylenediamine.

4. The mixture of claim 2 wherein said N-phenyl-N'-sec-alkyl-ortho-phenylenediamine is N - phenyl-N'-isopropyl-ortho-phenylenediamine.

5. The mixture of claim 1 wherein said N,N'-di-sec-alkyl-ortho-phenylenediamine contains from 3 to about 20 carbon atoms in each of the alkyls.

6. The mixture of claim 5 wherein said N,N'-di-sec-alkyl-ortho-phenylenediamine is N,N'-di-sec-butyl-ortho-phenylenediamine.

7. The mixture of claim 5 wherein said N,N'-di-sec-alkyl-ortho-phenylenediamine is N,N'-di-isopropyl-ortho-phenylenediamine.

8. The mixture of claim 1 incorporated in a stabilizing concentration in hydrocarbon distillate.

9. The mixture of claim 1 incorporated in a stabilizing concentration in gasoline.

References Cited

UNITED STATES PATENTS

| | | | |
|---|---|---|---|
| 2,294,724 | 9/1942 | Dreshfield | 252—401 |
| 2,436,838 | 3/1948 | Von Bramer et al. | 252—401 |
| 2,451,642 | 10/1948 | Watson | 252—50 |
| 2,498,630 | 1/1950 | Thompson | 252—50 |
| 3,290,376 | 12/1966 | Chenicek et al. | 252—401 |
| 3,384,614 | 5/1968 | Rosenwald | 252—401 |

DANIEL E. WYMAN, Primary Examiner

Y. H. SMITH, Assistant Examiner

U.S. Cl. X.R.

252—401